United States Patent [19]

Swanson et al.

[11] 4,194,300
[45] Mar. 25, 1980

[54] APPARATUS FOR HANDLING CREME FILLED SANDWICH COOKIES

[75] Inventors: George G. Swanson, Matawan, N.J.; Robert E. Strom, Hartsdale, N.Y.; Philip Jansen, N. Caldwell, N.J.

[73] Assignee: Nabisco, Inc., East Hanover, N.J.

[21] Appl. No.: 879,087

[22] Filed: Feb. 21, 1978

[51] Int. Cl.² ............................................. F25D 25/04
[52] U.S. Cl. ........................................ 34/217; 34/20; 34/236; 198/599; 198/822; 62/380
[58] Field of Search ................... 34/62, 217, 13, 20, 34/5, 205, 236, 225, 233; 99/450.4; 198/822, 599, 600; 62/380

[56] References Cited

U.S. PATENT DOCUMENTS

| | | | |
|---|---|---|---|
| 1,871,346 | 8/1932 | Savy | 34/20 X |
| 2,523,552 | 9/1950 | Birdseye | 34/5 X |
| 2,550,526 | 4/1951 | Braun | 34/20 X |
| 2,958,414 | 11/1960 | Kritter et al. | 198/822 X |
| 3,021,939 | 2/1962 | Hopkins et al. | 198/822 |
| 3,393,532 | 7/1968 | Khoylian | 34/217 X |
| 3,610,394 | 10/1971 | Sager | 198/600 X |

FOREIGN PATENT DOCUMENTS 631801  7/1936  Fed. Rep. of Germany ............ 34/236

Primary Examiner—William F. O'Dea
Assistant Examiner—Harold Joyce
Attorney, Agent, or Firm—Gerald Durstewitz; Paul E. O'Donnell

[57] ABSTRACT

Apparatus for handling creme filled cookies during a period in which the filling is hardening. The cookies are formed of a pair of baked base cakes separated by a layer of creme filling material which is applied in a heated fluid state and hardens as it cools. The apparatus includes a cooling tunnel and a conveyor extending through the tunnel. The conveyor is segmented, each segment having a bottom wall and a pair of side walls which form an elongated trough to carry a continuous column of cookies through the cooling tunnel. The side walls of the segments are inclined outwardly to tangentially engage the edge of the base cakes and support the cookies in a vertical position.

8 Claims, 11 Drawing Figures

APPARATUS FOR HANDLING CREME FILLED SANDWICH COOKIES

BACKGROUND OF THE INVENTION

The present invention relates to the manufacture of sandwich type comestible products comprising rigid base cakes separated by a layer of filling material which is applied in a flowable state and subsequently hardens or sets, and more particularly, to apparatus for handling such products during the period when the filling material is hardening.

Creme sandwich cookies are conventionally manufactured by placing the bottom base cake flat on a belt conveyor, depositing a warm semifluid layer of creme filling onto each of the bottom base cakes, and placing the top base cakes on top of the filling layer. The formed sandwiches are conventionally stacked on edge on a belt conveyor in continuous parallel columns, each column being positioned between a pair of longitudinally extending rods for lateral support. This conveyor passes through a cooling tunnel to cool and harden the creme filling and thus prevent distortion or separation of the cookies during subsequent handling by machinery which counts, stacks and packages the cookies.

As the column of sandwiches are moved along the lateral supporting rods, some creme filling material is occasionally transferred to the surface of the rods, where it hardens and tends to form the nucleus of a buildup of the filling material. In the exposed portions of the conveyor, such buildups can be seen and removed without interrupting the flow of product. The interior of the cooling tunnel, however, is not readily accessible and the buildup cannot be easily detected, and, if detected, cannot be removed while the production line is in operation. When a buildup occurs, the flow of product past the obstruction ultimately becomes blocked. The cookies then pile up, break, and flow over the rods so as to disrupt the operation of the entire production line. The line must then be shut down while the cooling tunnel is emptied and cleaned.

SUMMARY OF THE INVENTION

An object of the present invention is to provide improved apparatus for handling sandwich type comestible articles, comprising base cakes separated by a layer of filling material, during the period in which the filling is hardening.

Another object is to provide a self-cleaning conveyor arrangement for holding such articles on edge during the hardening period.

The foregoing objects are generally accomplished by providing, in a system for manufacturing round sandwich type comestible articles having rigid base cakes separated by a layer of filling material that is applied in a semifluid state and subsequently hardens, apparatus for handling the articles during the hardening period which comprises an endless segmented conveyor for transporting horizontal columns of articles through a cooling zone, the conveyor being formed of a plurality of interconnected segments having bottom and side walls so as to form a continuous trough extending the length of the conveyor, the side walls sloping outwardly toward the top to tangentially engage the edges of the base cakes to support the articles in a vertical position.

BRIEF DESCRIPTION OF THE DRAWINGS

A preferred embodiment of the invention has been chosen for purposes of illustration and description, and is shown in the accompanying drawing, forming a part of the specification, wherein:

FIG. 6 is a longitudinal sectional view taken along line 6—6 of FIG. 3.

FIG. 7 is a view taken along line 7—7 of FIG. 6.

FIG. 11 is a plan view of the underside of the segmented conveyor of the invention.

DESCRIPTION OF THE PREFERRED EMBODIMENT

Figure 1:
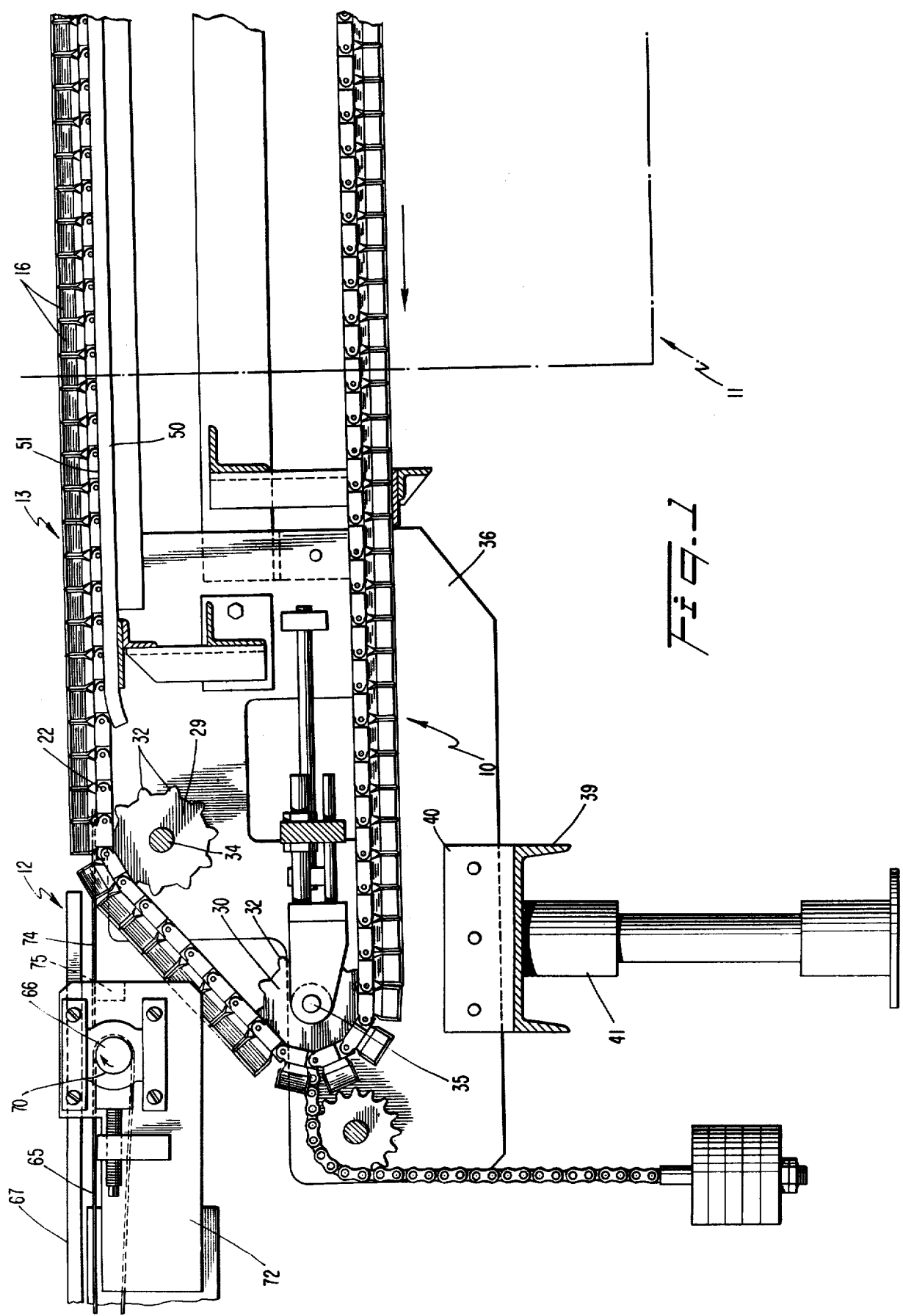
FIG. 1 is a side elevation view of the input end of apparatus according to the present invention.

Referring now to the drawings in detail there is shown apparatus incorporating the present invention which generally includes a segmented conveyor 10 a cooling tunnel 11, an arrangement 12 for loading the conveyor 10, an arrangement 14 for unloading the conveyor 10, and a cylindrical brush 15 for cleaning the conveyor 10.

The conveyor 10 is made up of a plurality of endless flexible carriers 13 extending in side by side relationship through the cooling tunnel 11. Each flexible carrier 13 is made up of a series of plastic segments 16 which are pivotally interconnected to form a continuous carrier for transporting edge stacked sandwich cookies. Each segment 16 includes a section 17 in the form of a link of a sprocket driven chain, and a cradle section 19 mounted on this link section. As best shown in FIG. 12, the link section 17 has a tongue 20 on one end, a pair of arms 21 on the other end which are spaced to receive the tongue of the adjoining segment, a pin 22 pivotally joining the tongue and arms of adjacent segments, and a central aperture 24 for receiving the teeth of a sprocket wheel. The cradle section 19 includes a base portion 25 mounted on the link section a pair of side walls 26 which are inclined to diverge as they extend away from the base 25 as shown in FIG. 7. The walls 26 are positioned to tangentially contact the edges of the cookies so that the cookies are substantially spaced from the upper surface 27 of the base 25 to allow air to circulate through the column of cookies as it moves through the cooling tunnel.

One common type of sandwich cookie is about 1 13/16 inches in diameter. For such an article, the width of the surface 27 (between the walls 26) is about 13/16 inch, the walls 26 extend about 1¼ inches upwardly and outwardly from the surface 27 at an angle of about 120 degrees thereto so that the outer ends of the walls 27 are spaced about 2 inches apart. When a cookie having a diameter of 1 13/16 inch is supported by a conveyor of these dimensions, a space of about 3/16 inch is provided between the cookie and the surface 27.

The segments 16 are formed so that when a section of the flexible carrier 13 extends along a flat plane, the cradle sections 19 of adjacent segments abut each other to form a continuous trough extending the length of that section. Each flexible carrier 13 extends around an upper idler sprocket 29 and a lower idler sprocket 30 at the input end of the conveyor, and a driven sprocket 31 at the output end. Each of the sprockets are provided with a plurality of teeth 32 which fit into the apertures 24 of the link sections. The sprockets are mounted on rotatable shafts which are supported by a pair of vertical frame plates provided at each end of the conveyor. At the input end of the conveyor, the sprockets 29 and 20 are respectively mounted on shafts 34 and 35. The shaft extends between and is journalled in frame plates 36 and 37. The shaft 35 is part of a conventional conveyor tensioning arrangement mounted on the frame plates. The plates 36 and 37 are secured to a channel cross member 39 by means of sections 40 of angle iron. The channel member 39 is supported by a pedestal 41. At the output of the conveyor the sprockets 31 are mounted on a shaft 42 which extends between, and is journalled in, frame plates 44 and 45. The plates 44, 45 are secured to a channel cross member 46 is supported by a pedestal 49.

The upper flight of each of the flexible carriers 13 rides in and is supported by a track 50 which extends through the cooling tunnel from adjacent the sprocket 29 to adjacent the sprocket 31. The tracks 50 are provided with edge lips 51 to maintain the alignment of the upper flight. The lower (return) flights of the carriers 13 ride on rails 52. These rails 52 extend through the cooling tunnel beneath the tracks 50 and have a cross-sectional configuration that conforms to the inner walls of the now inverted cradles 19. The tracks 50 and rails 52 are supported by structural members provided both within the cooling tunnel and at the end frame plates.

Figure 2:
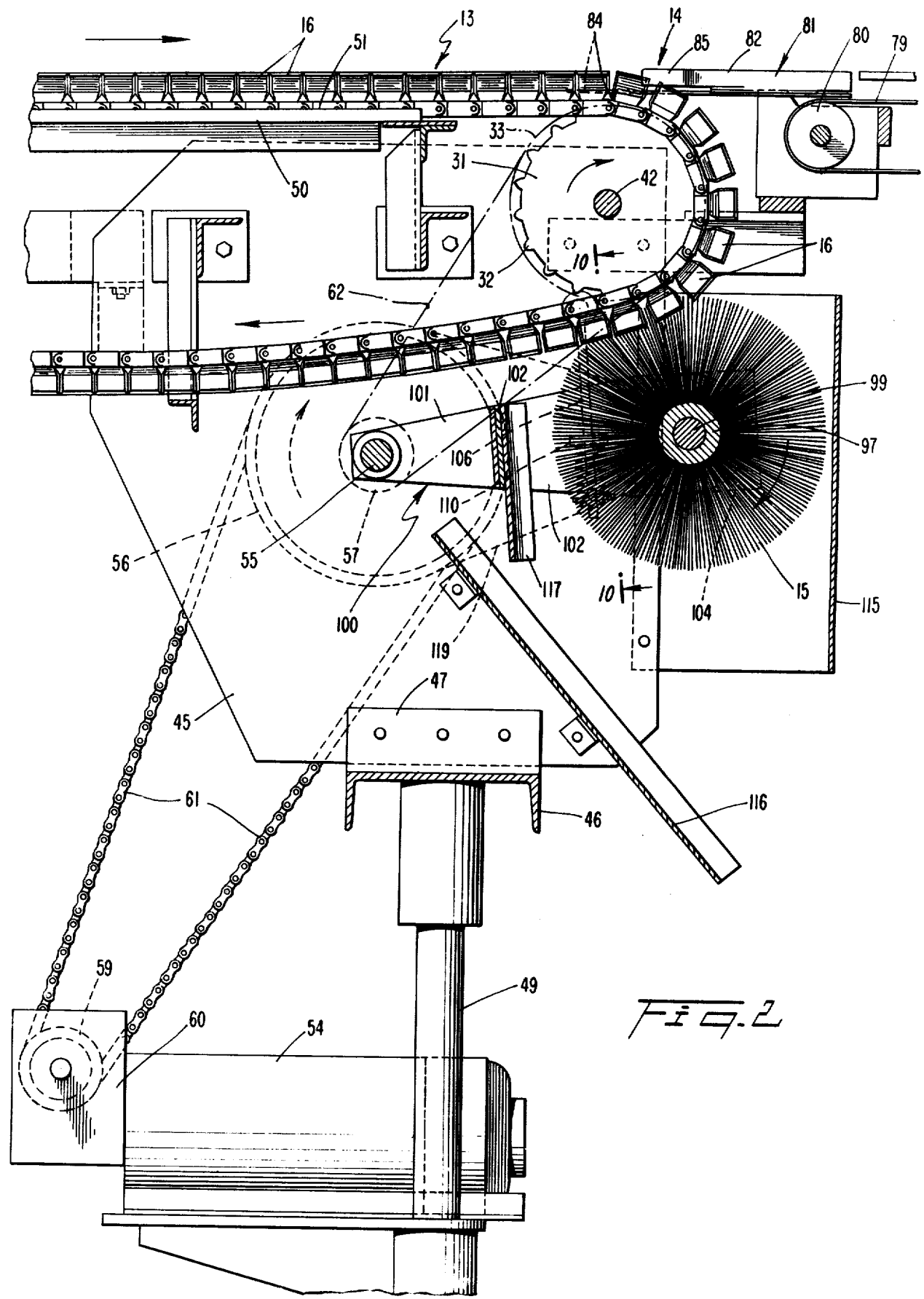
FIG. 2 is a side elevation view of the output end of the apparatus of FIG. 1.
Figure 4:
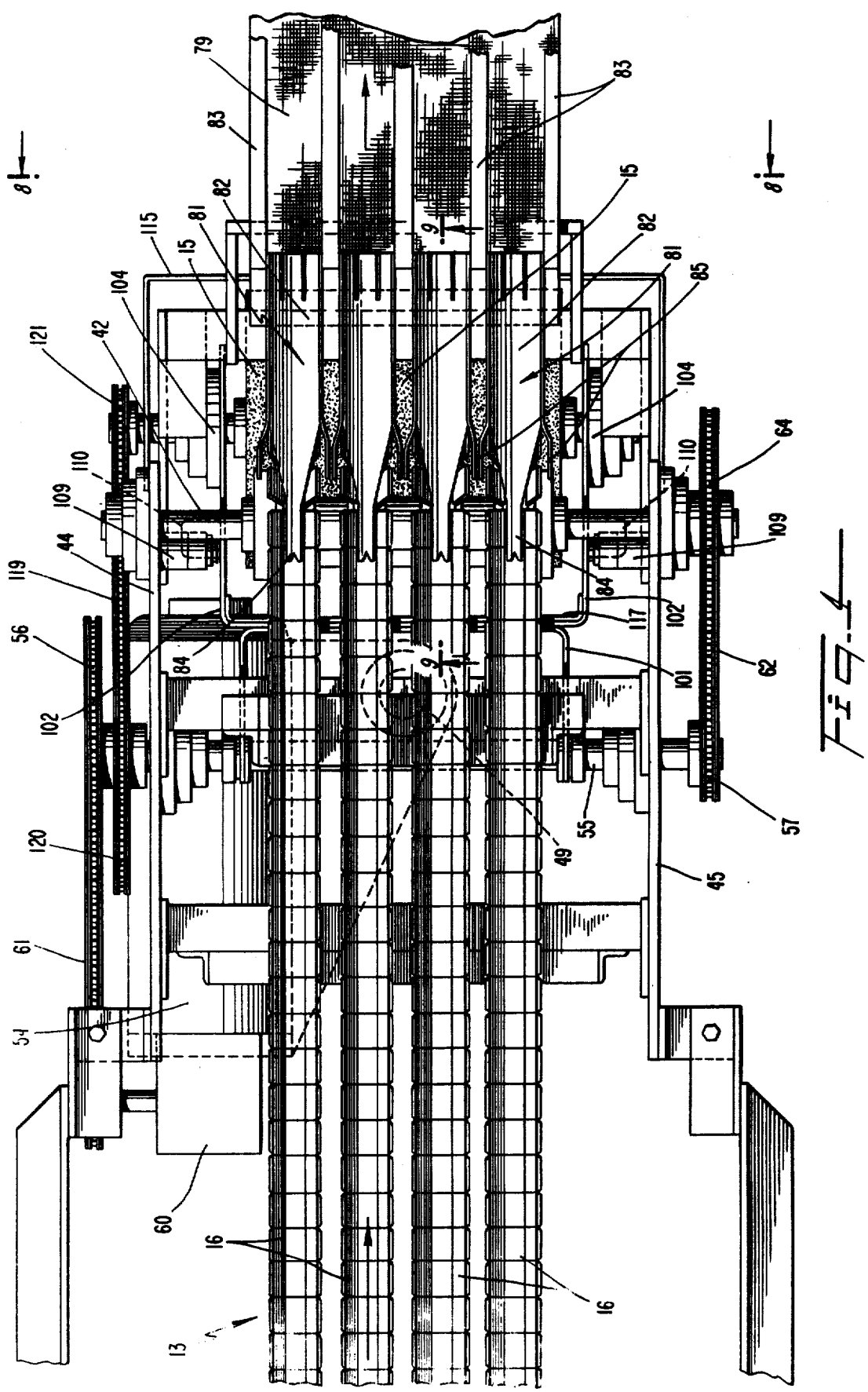
FIG. 4 is a plan view of the mechanisms shown in FIG. 2.

As shown in FIGS. 2, 4 and 7, the conveyor 10 and the brush 15 are driven by a motor 54. A shaft 55 extends through, and is journalled in, the frame plates 44, 45 below the lower flight of the conveyor 10. A large diameter sprocket wheel 56 is mounted on one end of the shaft 55 and a small diameter sprocket wheel 57 is mounted on the other end. The motor drives a sprocket 59 through a gear box 60. The sprocket 59 drives the sprocket 56 through a chain 61. The shaft 55 rotates and drives the shaft 42 through a chain 62 which extends from the sprocket 57 and a sprocket 64 mounted to the end of the shaft 42.

Figure 3:
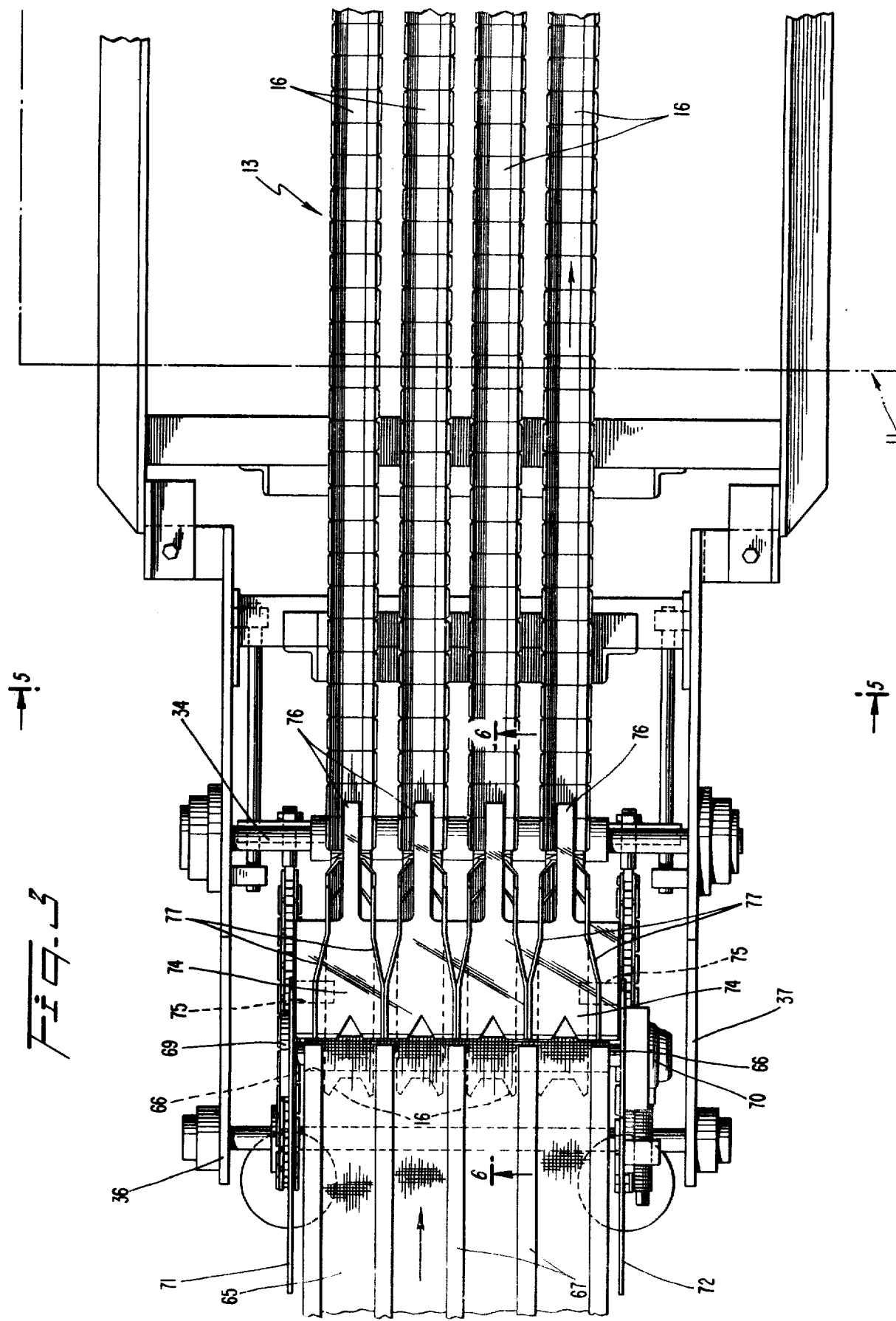
FIG. 3 is a plan view of the mechanisms shown in FIG. 1.

The arrangement 12 for loading the conveyor includes, as shown in FIGS. 1, 3 & 6, an infeed conveyor belt 65 moving around a noser roll 66 adjacent to the input end of the conveyor 10. Above the belt 65, a number of guide bars 67 extend longitudinally along the belt. The bars 67 are spaced from each other at intervals across the belt to accommodate therebetween columns of cookies stacked on edge upon the belt. These bars provide lateral support for maintaining the alignment of the columns.

The noser roll is journalled in bearings 69 and 70 which are mounted to frame plates 71 and 72 on either side of the conveyor belt 65. A transfer plate 74 is mounted to the plates 71, 72 by means of brackets 75 between the noser roll and the conveyor 10 to carry the columns of cookies (being pushed from behind) over to the conveyor 10. The portion of the column on the transfer plate is pushed across by the cookies on the conveyor. The transfer plate 74 is formed with fingers 76 which extend between the walls 26 of the segments 16 moving over the sprockets 29. The fingers are vertically positioned so that the cookies supported thereby are slightly lower than the cookies supported by the flexible carriers 13. Therefore, as the columns of cookies are moved along the fingers past the vertical centerline of the sprocket, the segments 16 of the carrier 13 engage and lift the columns from the fingers and carry them toward the cooling tunnel. Guide blades 77 attached to the ends of the bars 67 maintain the alignment of the cookies as the columns move across the transfer plate 74.

The conveyor unloading arrangement 14 includes (as shown in FIGS. 2, 4, 8 and 9) a conveyor belt 79 moving around a noser roll 80 adjacent the output end of the conveyors 10 and a discharge chute 81 aligned with each of the flexible conveyors 13. The chutes 81 are positioned between the flexible conveyors 13 and the unloading belt 79 to transfer the columns of cookies from the conveyors 13 to the belt 79. The cross sectional shape of the chutes 81 is that of an upwardly facing circular arc. The chutes include a body section 82 having a full semicircular cross section and a finger section 84 of lesser transverse extent. A pair of guide arms 85 extend from the end of the body sections.

Figure 9:
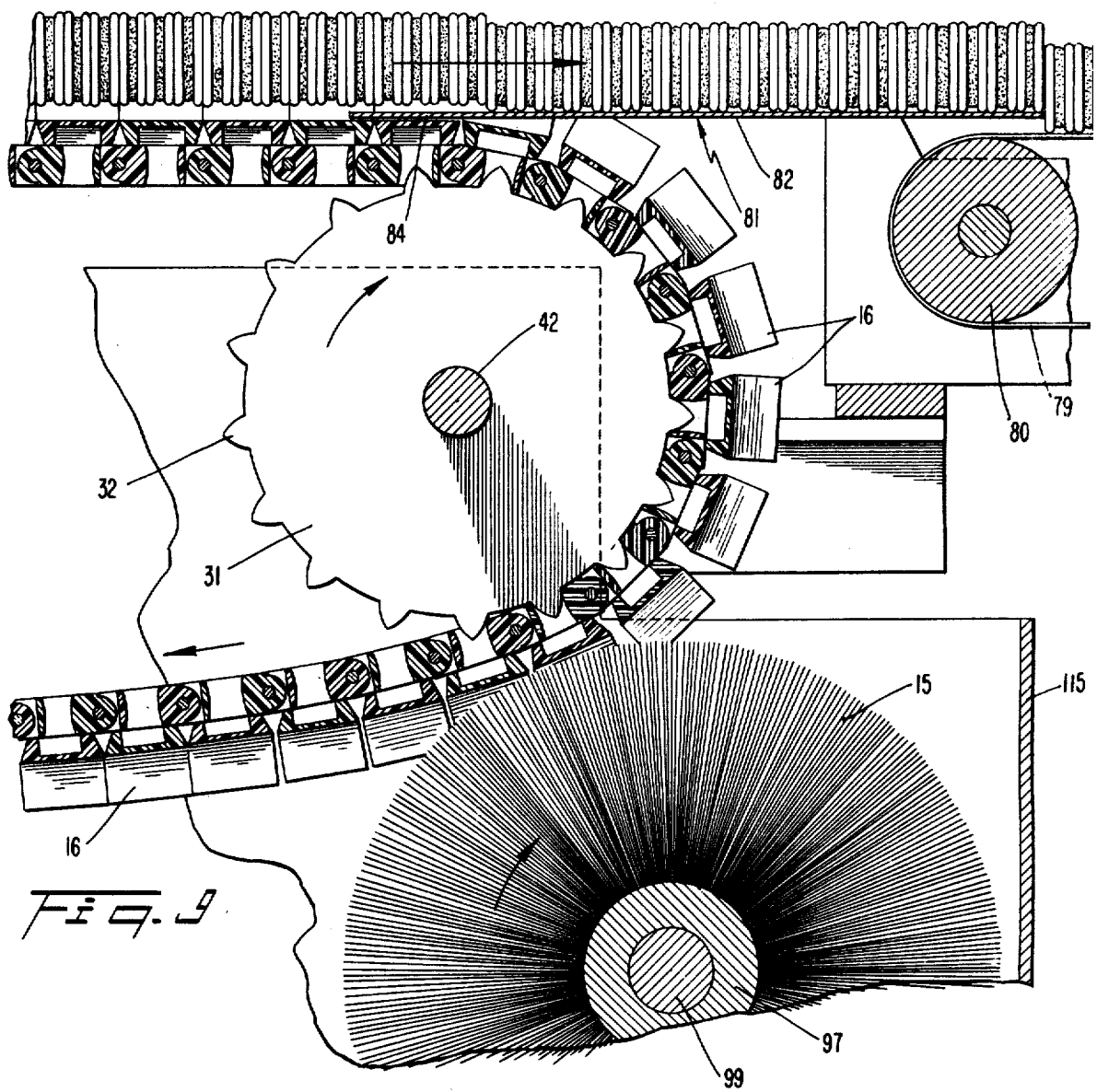
FIG. 9 is a longitudinal sectional view taken along line 9—9 of FIG. 4.

As best shown in FIG. 9, the finger sections 84 of the chutes 81 extend into the trough formed by the segments 16. The fingers 84 are vertically positioned slightly below the level of the bottom edge of the cookies as they approach the sprocket wheel 31. As each segment 16 moves around the sprocket 31, the cookies carried thereby are lowered onto the finger 84. The cookies are pushed along the chutes 81 by the column of cookies behind them. At the end of the chutes 81, the cookies move onto the conveyor 79 and are laterally supported by stationary guide rails 83.

Figure 5:
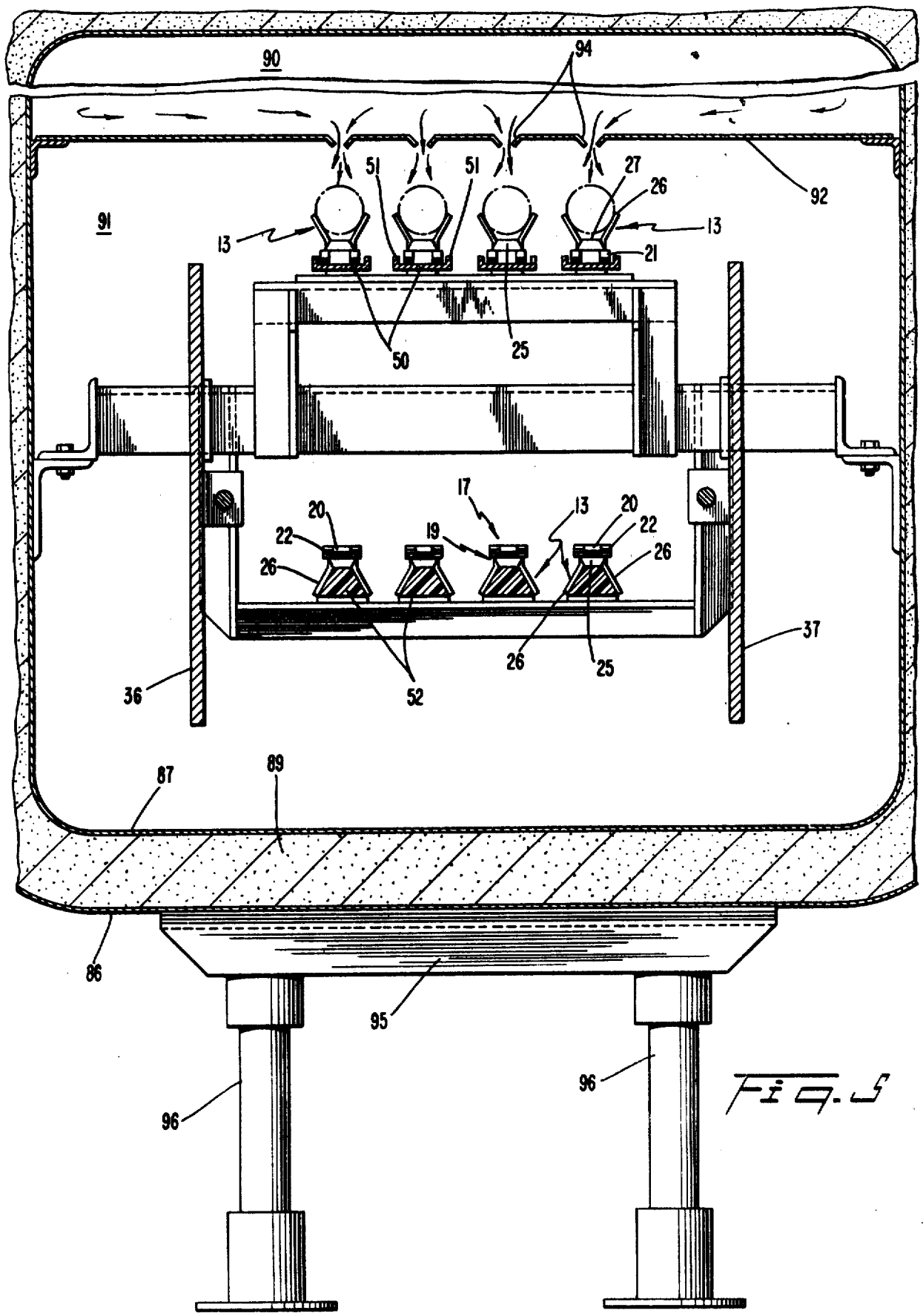
FIG. 5 is a transverse sectional view taken along line 5—5 of FIG. 3.
Figure 8:
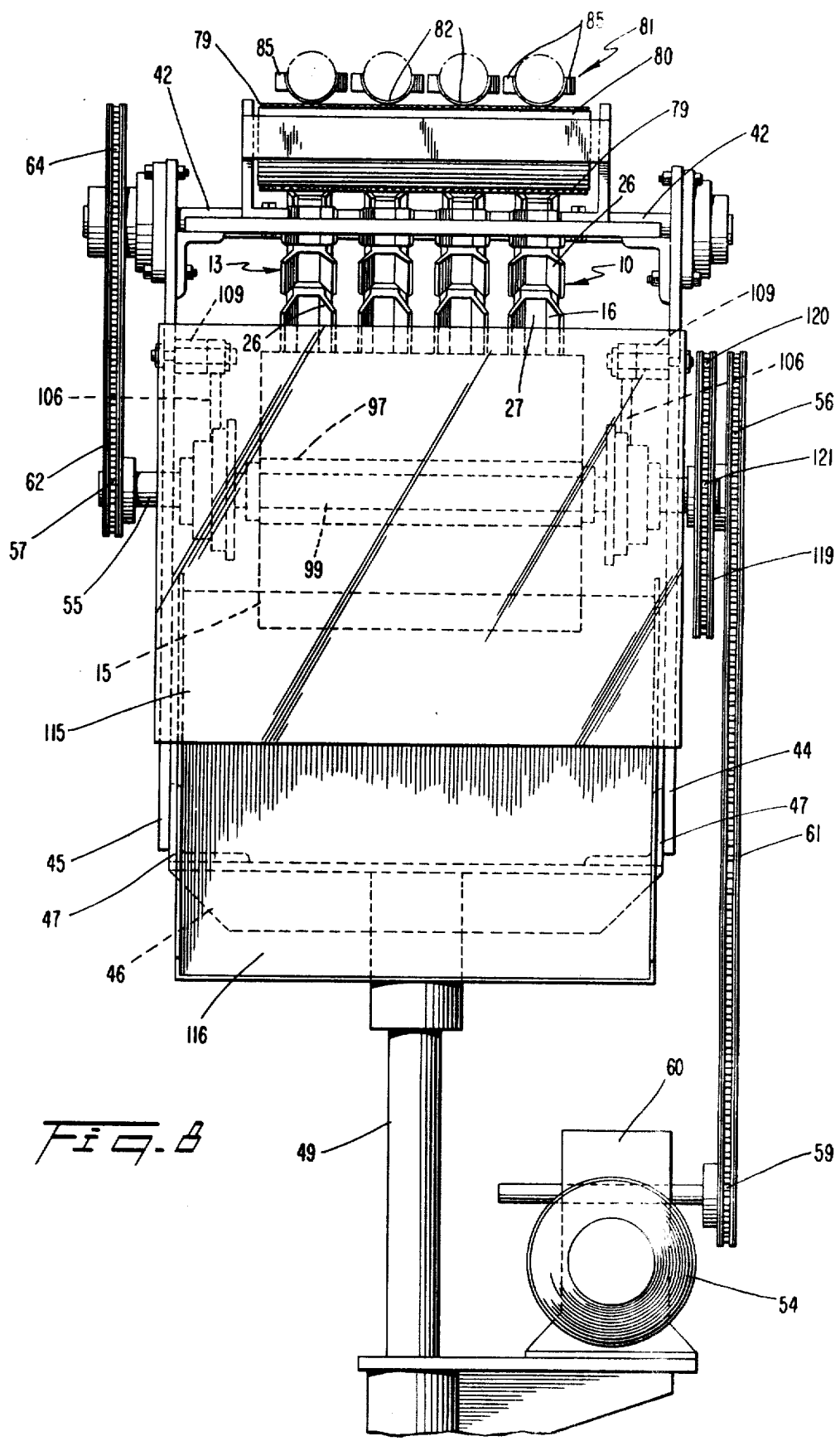
FIG. 8 is a transverse sectional view taken along line 8—8 of FIG. 4.

Referring to FIG. 5, the cooling tunnel 11 construction is conventional having an outer wall 86, an inner wall 87, and a layer of insulation 89 between the inner and outer walls. The interior of the tunnel is divided into an upper chamber 90 and a lower chamber 91 by a horizontal partition 92. The upper chamber is connected to a source of refrigerated air and functions as a cold air conduit. The conveyor 10 passes through the lower chamber with its upper flight positioned close to the partition 94. A series of slots 94 are formed in the partition inline with each flexible carrier 13 to direct cool air downwardly onto the cookie columns transported by the carriers 13. The cooling tunnel rests on a number of channel members 95 which extend transversely of the tunnel between pairs of pedestals 96.

When the cookies enter the cooling tunnel, the creme filling is still soft and permits relative movement of the two base cakes. The sloping side walls 26 of the segments 16 positively position and firmly support each base cake. Since the segments are travelling with the cookies, there is no drag (as is the case when stationary guides are used) which would tend to angle the cookies from a vertical orientation, causing a misalignment of the top and bottom base cakes. Therefore, if in the assembly of the cookies, the two base cakes are not in perfect alignment, they tend to be brought into alignment during the initial phase of the trip through the cooling tunnels as gravity pulls each base cake into contact with both of the walls 26. As the cookies continue through the tunnel, the filling sets up and thereafter holds the base cakes in alignment.

Figure 10:
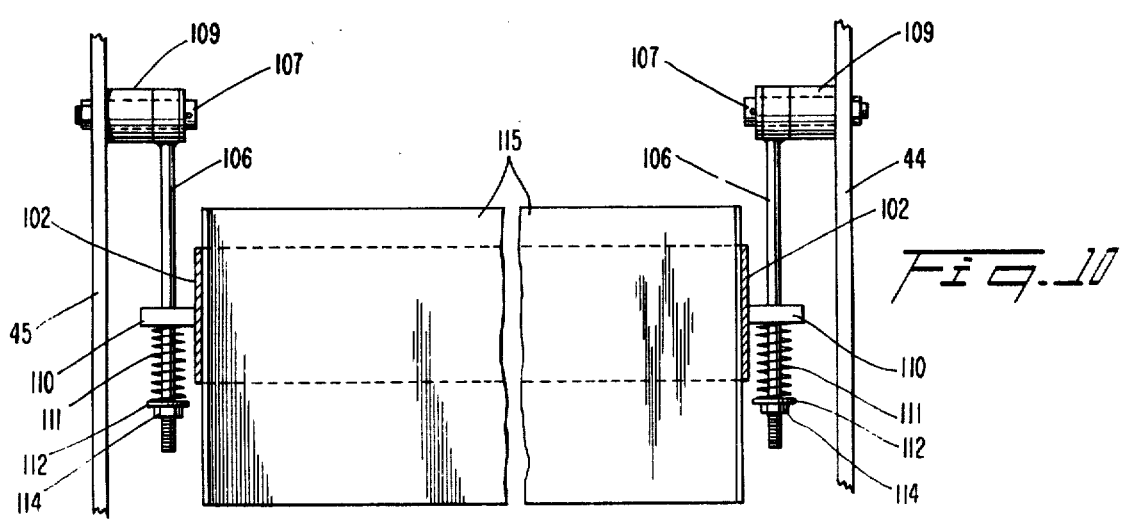
FIG. 10 is a transverse sectional view taken along line 10—10 of FIG. 2.

The brush 15 includes a sleeve 97 in which the bristles are embedded, and a shaft 99 to which the sleeve 97 is keyed. The shaft 99 is supported by an arm assembly 100 which is pivoted on the shaft 55. The assembly 100 includes a first "U" shaped arm member 101 having its free ends pivoted to the shaft 55, and a second "U" shaped arm member 102 fastened back to back to the arm member 101. The shaft 55 is journalled to the free ends of the arm member 102 in bearings 105. Th brush 15 is held in contact with the conveyor segments 16 by means of a pair of pivoted eye bolts 106, as best shown in FIG. 10. The eye bolts 106 are mounted to the inner surfaces of the plates 44, 45 by bolts 107 that extend through bosses 109 provided on the plates. The eyebolts 106 extend through ears 110 welded to the outer surfaces of the sides of the arm member 102. A coil spring 111 is positioned on the lower end of each of the bolts 106 and is compressed between the ear 110 and a washer 112 held in place by a nut 114. Three shields 115, 116 and 117 are positioned around the brush 15 to confine the materials removed from the flexible conveyors 13 by the cleaning action of the brush. The shields 115 and 116 extend between the plates 44 and 45, behind and below the brush 15 respectively. The shield 117 is mounted on the arm 100 in fromt of the brush.

The brush 15 is driven by a chain 119 which encircles a large diameter sprocket 120 mounted on the shaft 55 and a small diameter sprocket 121 mounted on the brush shaft 99. The flexible carriers 13 and the brush 15 are both driven in the clockwise direction as viewed in FIG. 2 so that the bristles of the brush are moving in the direction opposite to that of the segments 16 at the point of contact therebetween. The brush 15 is driven at a high speed relative to that of the carriers 13 to enhance the cleaning action thereof. Any creme filling material which is deposited upon the interior surfaces of the segments 16 is removed by the brush 15. No buildup of material can take place to interfere with the operation of the line.

It can be seen from the foregoing that the present invention provides improved apparatus for handling sandwich type comestible articles made of base cakes that are separated by a layer of filling material, the apparatus including a self-cleaning conveyor arrangement for holding the base cakes in alignment during the period in which the filling is hardening.

We claim:

1. In a system for manufacturing round sandwich type comestible articles having rigid base cakes separated by a layer of filling material that is applied in a flowable state and subsequently hardens, apparatus for handling the articles during the hardening period while they pass through a cooling zone which comprises an endless segmented conveyor extending horizontally through said cooling zone for transporting horizontal columns of articles through said zone, said conveyor being formed of a plurality of pivotally interconnected segments, each segment having a bottom wall and a pair of sidewalls forming a portion of a continuous trough extending longitudinally of the conveyor, said side walls being divergent extending upwardly and outwardly from said bottom wall to tangentially engage the edges of the base cakes, said side walls of said segments being arranged to support the articles above the bottom wall of said segments, means for placing articles on said conveyor at one end thereof, and means for removing the articles from the conveyor at the other end thereof.

2. Apparatus according to claim 1, including an elongated housing defining said cooling zone, and means for introducing refrigerated air into said zone.

3. Apparatus according to claim 2, wherein said conveyor has an upper flight which carries the articles through the cooling zone and a lower return flight in which the conveyor segments are inverted and wherein said means for placing articles on the conveyor and said means for removing articles from the conveyor include conveyor supporting wheel members at each end of said upper flight, infeed and outfeed conveyors, infeed and outfeed article supporting fingers extending from said infeed and outfeed conveyors over said wheel members into the trough formed by said segments so that as the segments travel in an arc at the wheel members the segments move vertically with respect to the fingers and effect an article transfer therebetween.

4. Apparatus according to claim 3 including means for cleaning the inner surfaces of said conveyor segments to remove any filling material transferred thereto by said articles.

5. Apparatus according to claim 4 wherein said cleaning means is a rotating circular brush positioned adjacent one of said wheel members to extend into conveyor segments in contact with said one of said wheel members.

6. Apparatus according to claim 5 wherein said wheel members are provided with sprocket teeth and bottom wall of said conveyor segments are formed to receive said teeth.

7. Apparatus according to claim 6 wherein said refrigerated air means includes an air duct above said cooling zone and elongated nozzle means positioned above said upper flight of said segmented conveyor for directing refrigerated air toward the column of articles carried by said segmented conveyor.

8. Apparatus according to claim 7, wherein a rigid track member extends through said cooling zone and said upper flight of said segmented conveyor is positioned on and supported by said track member.

* * * * *